United States Patent [19]

McMillan

[11] Patent Number: 5,564,216
[45] Date of Patent: Oct. 15, 1996

[54] FISHING LURE HOOK ASSEMBLY AND METHOD

[76] Inventor: William A. McMillan, Rte. 2, Box 160-EE, Bluffton, S.C. 29910

[21] Appl. No.: 303,871

[22] Filed: Sep. 9, 1994

Related U.S. Application Data

[63] Continuation of Ser. No. 101,773, Aug. 2, 1993, abandoned, which is a continuation of Ser. No. 915,530, Jul. 20, 1992, abandoned.

[51] Int. Cl.⁶ ........................................... A01K 83/02
[52] U.S. Cl. ........................................... 43/37; 43/35; 43/36
[58] Field of Search ........................................... 43/34, 35, 36, 43/37

[56] References Cited

U.S. PATENT DOCUMENTS

| | | | |
|---|---|---|---|
| 610,098 | 8/1898 | Sly | 43/35 |
| 1,009,538 | 11/1911 | Lowe | 43/35 |
| 1,774,539 | 9/1930 | Ahlfors | 43/36 |
| 2,136,713 | 11/1938 | Schnabel | 43/35 |
| 2,242,592 | 5/1941 | Noxon | 43/35 |
| 2,526,288 | 10/1950 | Shields | 43/36 |
| 2,748,520 | 6/1956 | Anderson | 43/35 |
| 3,026,645 | 3/1962 | Burnett | 43/37 |
| 3,059,371 | 10/1962 | Haynie | 43/35 |
| 3,100,359 | 8/1963 | Laba | 43/37 |
| 4,079,538 | 3/1978 | Burnett | 43/37 |
| 4,525,948 | 7/1985 | Huntington | 43/42.04 |

*Primary Examiner*—Kurt Rowan
*Attorney, Agent, or Firm*—Ralph Bailey, P.A.

[57] ABSTRACT

A spring loaded fishing lure (10) includes a fishhook assembly comprised of a plurality of fishhooks (A) having resilient legs (13a) converging in a single juncture at ends opposite respective barbed ends. The juncture together with adjacent portions (13b) of the resilient legs forms a spring (B) urging the barbed ends radially outwardly apart from each other. The fishhook assembly resides in an elongated bore (11) of a fishing lure body (C) and is held therein by a retainer (D), such that a wall (14) of the elongated bore holds the fishhooks in compressed relation. When a fish strikes, the fishhook assembly slides toward the retainer, permitting the barbed ends to spread apart radially outwardly within the mouth of the fish. Additionally, since the resilient legs (13a) move easily responsive to the open-and-shut motion of the fish's mouth, the fish cannot disengage it from the barbs. Accordingly, enhanced fish-catching characteristics are provided.

1 Claim, 3 Drawing Sheets

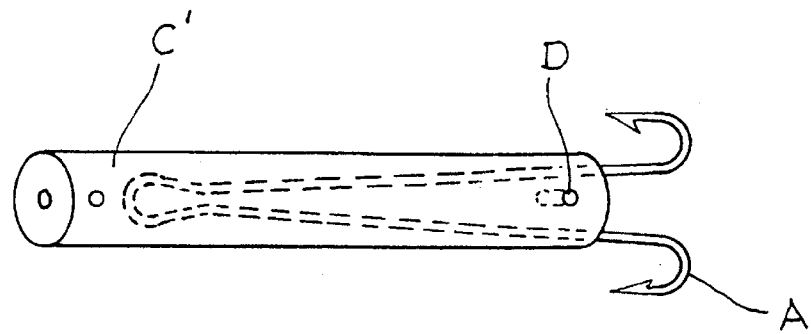
Fig. 5.
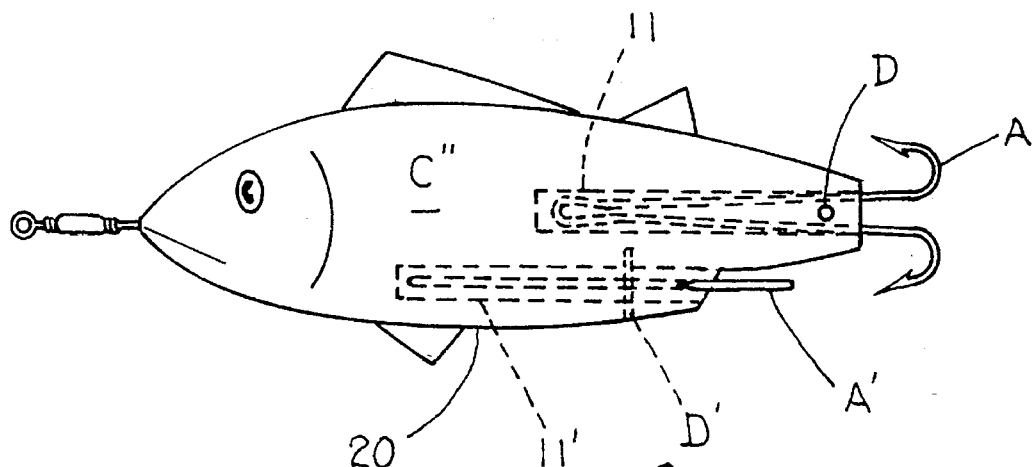
Fig. 6.
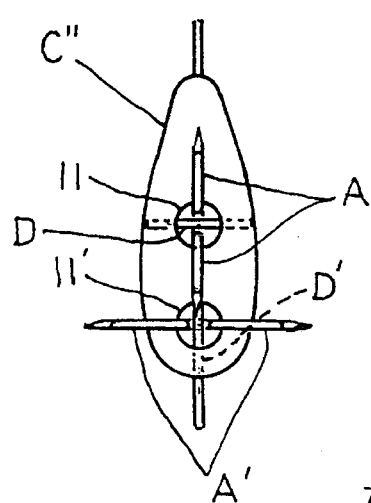
Fig. 6-A.

FISHING LURE HOOK ASSEMBLY AND METHOD

This application is a continuation of application Ser. No. 08/101,773, filed Aug. 2, 1993, now abandoned, which is a continuation of application Ser. No. 07/915,530, filed Jul. 20, 1992, now abandoned.

BACKGROUND OF THE INVENTION

This invention relates to a fishing lure assembly comprised of a plurality of spring-loaded fishing hooks disposed in a fishing lure body.

The use of fishhook assemblies having a plurality of hooks is well known in the art. For instance, U.S. Pat. No. 5,077,930 discloses a fishing lure wherein a plurality of hooks is coupled by a swivel member to an eyelet fixed to the tail end of the lure body.

U.S. Pat. No. 3,175,322 discloses a pair of fishhooks wherein a latch pin may be moved into and out of engagement with latch loops of a helical compression spring wrapped around the shank of each hook. A fish strike pulls the hooks away from a free end of the latch pin, releasing it from the latch loops of the spring and enabling the spring to spread the barbed ends of the hooks apart from each other. The latch pin and helical spring of the disclosed device are elements which are separate from the pair of fishhooks.

U.S. Pat. No. 3,241,260 discloses a pair of fishhooks having rigid shanks extending upwardly toward each other, terminating in a spring integral with each shank and tending to bias the shanks away from each other. A clip positioned astride the shanks holds them in contracted relation for baiting. Upon a fish strike, a fishing line pulls the clip toward the spring, releasing the shanks and allowing them to spread apart to enhance engagement of the fishhook barbs with the fish's mouth.

The latter two above devices require a separate, external member to hold the shanks of fishhooks in contracted relation, and none of the above devices disclose a fishhook assembly having fishhooks with resilient legs disposed within the body of a fishing lure.

Accordingly, it is an important object of the present invention to provide a spring loaded fishing lure that eliminates the need for an externally attached member to hold fishhooks in compressed relation.

It is a further object of the present invention to provide a spring loaded fishing lure with a plurality of fishhooks having respective resilient legs.

It is a further object of the present invention to provide a spring loaded fishing lure wherein flexible resilient legs of fishhooks are provided with respective outward bends near the juncture joining the fishhooks.

It is a still further object of the present invention to provide a spring loaded fishing lure wherein a plurality of fishhooks are disposed within a fishing lure body.

It is a still further object of the present invention to provide a spring loaded fishing lure that requires only a minimum number of parts, thereby fostering simplicity in production.

SUMMARY OF THE INVENTION

It has been found that a spring loaded fishing lure may be provided wherein a plurality of fishhooks disposed within a fishing lure body are integrally joined by a spring biasing barbed ends of the fishhooks apart from each other.

A plurality of fishing hooks are provided with resilient legs and conventional barbs at each end. The ends of the hooks opposite the barbed ends join in a single juncture, comprising a fishhook assembly having a spring formed by the juncture and adjacent portions of the legs biasing the barbed ends radially outwardly apart from each other. The fishhook assembly is inserted into an elongated bore formed in a fishing lure body so that the barbed ends protrude from the body, resembling a natural fish tail. A suitable retainer such as a transverse pin holds the fishhook assembly within the elongated bore. A fish strike causes the fishhook assembly to move toward the retainer, thereby allowing the barbed ends to spread apart radially outwardly at a distance such that the fish cannot open its mouth wide enough to escape engagement by the barbs. Moreover, the fish cannot disengage its mouth from the barbs since the resilient legs move easily responsive to the open-and-shut motion of the mouth. Accordingly, the present invention enables the user to increase his yield of fish caught.

Alternatively, the fishhook assembly may be inserted into the "belly" or underside of the lure. Furthermore, the fishing lure body may be fishlike or cylindrical in shape or may assume any other appropriate shape.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is a perspective view of a spring loaded fishing lure constructed in accordance with a modified embodiment of the present invention;

FIG. 6 is a side elevation view illustrating a baiting position of a spring loaded fishing lure constructed in accordance with another modified embodiment of the present invention, and FIG. 6A is a rear view of the spring loaded fishing lure shown in FIG. 6.

DESCRIPTION OF A PREFERRED EMBODIMENT

The drawings illustrate a spring loaded fishing lure. A fishhook assembly is comprised of a plurality of fishhooks A having resilient legs converging in a single juncture at ends opposite respective barbed ends. The juncture and adjacent portions of the legs form a spring B urging the barbed ends radially outwardly apart from each other. The fishhook assembly is disposed within an elongated bore within a fishing lure body C such that a wall of the elongated bore holds the fishhooks in compressed relation. A retainer D holds the fishhook assembly within the elongated bore. A fish strike causes the fishhook assembly to slide toward the retainer permitting the barbed ends to spread apart radially outwardly within the mouth of a fish to provide enhanced fish-catching characteristics.

Figure 1:
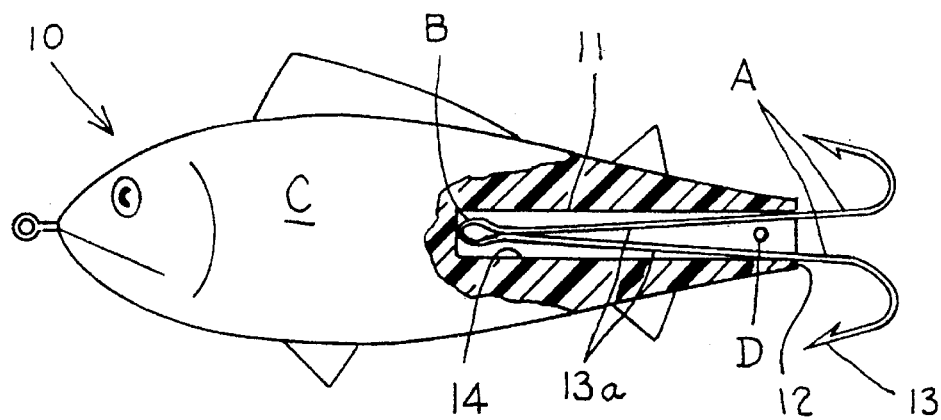
FIG. 1 is a side elevation view with parts broken away, illustrating a baiting position of a spring loaded fishing lure constructed in accordance with a preferred embodiment of the present invention.
Figure 2:
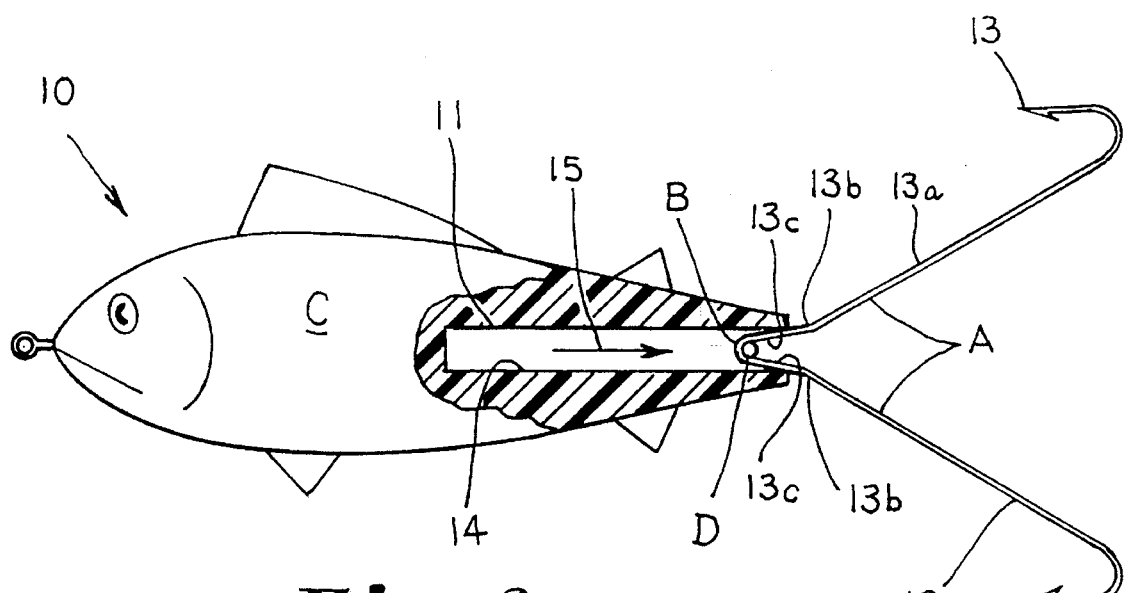
FIG. 2 is a view similar to that of FIG. 1 showing a fishhook assembly moved rearwardly.

Referring to FIGS. 1 and 2, a preferred embodiment of the spring loaded fishing lure 10 is shown wherein the fishhook assembly is disposed within the elongated bore 11 extending substantially along the longitudinal axis of fishing lure body C. In this embodiment, the elongated bore originates at a tail end 12 of the body C. The figures illustrate only a pair of fishhooks, but it is to be understood that a greater number of fishhooks are contemplated as being within the scope of the present invention. Each fishhook A is provided with a conventional barb 13 and a respective leg 13a constructed of flexible resilient wire. Such wire must be sufficiently flexible to allow the legs to move responsive to the open-and-shut motion of a fish's mouth, yet it must be of such stiffness so as to ensure that the barbs 13 remain pointed in a radially outward position.

At ends opposite the barbed ends the fishhooks join at a single loop forming a juncture and with parallel intermediate adjacent portions 13c, outward bends 13b, and resilient legs 13a forming spring B resiliently urging the barbed ends 13 radially outwardly apart from each other. The bends 13b and parallel intermediate adjacent portions 13c join the legs and the juncture in diverging relation. Retainer D, shown as a pin extending through the body C transversely to a longitudinal axis thereof, retains the fishhook assembly within the bore 11. When the fishhook assembly is in the baiting position shown in FIG. 1, a wall 14 of the elongated bore 11 holds the fishhooks A in compressed relation, and the barbed ends 13 protrude outwardly from the body C, resembling a natural fish tail.

Pulling the fishhook assembly rearwardly in the direction shown by arrow 15 (FIG. 2) frees the fishhooks A from wall 14 of elongated bore 11 so that the barbed ends 13 spread radially outwardly apart from each other responsive to the action of spring B. The fishhook assembly is shown as having been moved to the maximum extent permitted by pin D.

Figure 3:
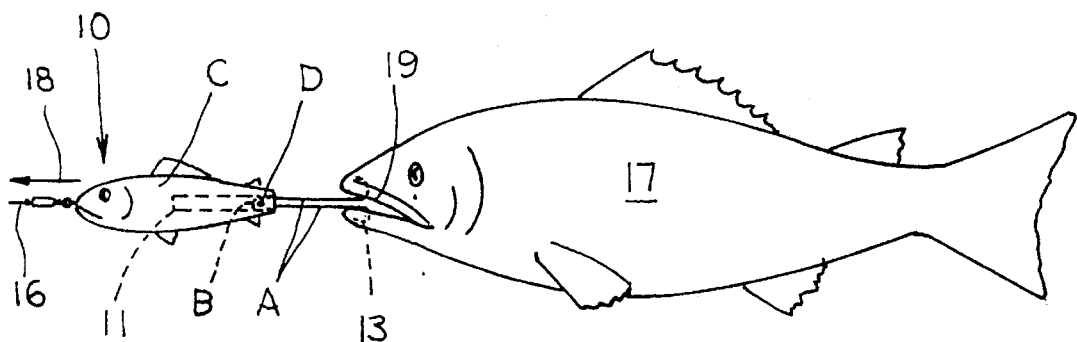
FIG. 3 is a side elevation view of the spring loaded fishing lure shown in FIGS. 1 and 2 illustrating the operation of the lure during a fish strike.
Figure 4:
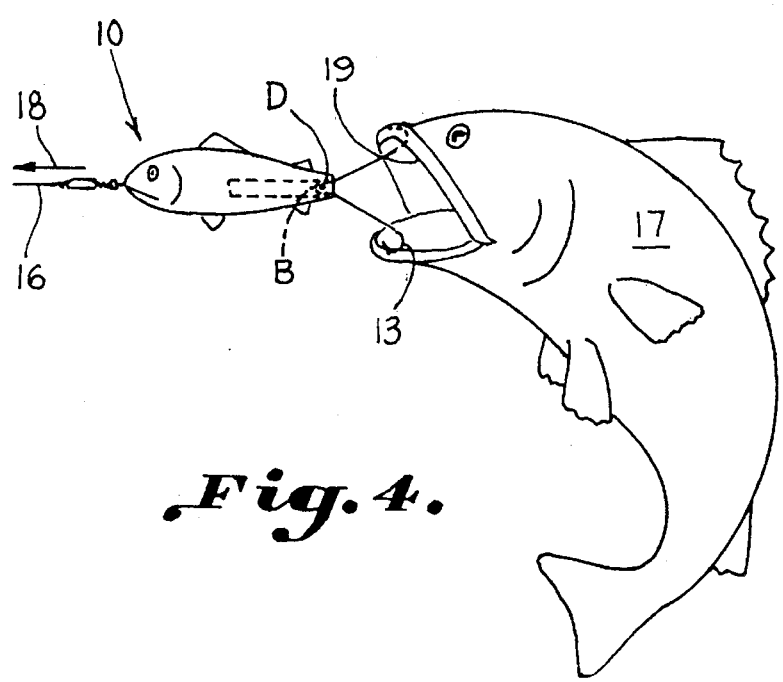
FIG. 4 is a view similar to that shown in FIG. 3 wherein the mouth of a fish is open, illustrating the extent of radial separation of fishhook barbs.

FIGS. 3 and 4 illustrate the operation of the preferred embodiment during a fish strike. The lure 10 is attached at its front end to a fishing line 16 in any conventional manner. When a fish 17 strikes the lure 10, the pull exerted on the lure by the fishing line 16 in the direction shown by arrow 18 causes the fishhook assembly to move rearwardly with respect to the fishing lure body C, resulting in the fishhook assembly position shown in FIG. 2. The barbed ends 13 are urged radially outwardly by the spring B against the force of the closed mouth 19 (FIG. 3) of fish 17. As shown in FIG. 4, the distance between barbed ends 13 is such that the fish cannot open its mouth 19 wide enough to escape engagement by the fishhook barbs. Furthermore, the fish cannot disengage its mouth 19 from the barbs since the resilient legs 13a move easily responsive to the open-and-shut motion of the mouth. Improved fish-catching results are thereby accomplished by the present invention.

FIG. 5 illustrates a modified embodiment of the present invention wherein a fishing lure body C' is cylindrical in shape. Fishhooks A and retainer D are employed in the same manner as in the preferred embodiment.

Another modified embodiment of the present invention is illustrated in FIG. 6, wherein a second elongated bore 11' is formed into the underside 20 of fishing lure body C". Elongated bore 11' may be oriented at any angle to the longitudinal axis of the body and need not be oriented in the manner shown. A second fishhook assembly comprised of fishhooks A' and constructed similarly to that comprised of fishhooks A is disposed within the bore 11', and a second retainer D' secures the second fishhook assembly within the bore 11'. As best seen in FIG. 6A, fishhooks A' are at right angles to fishhooks A; however, any suitable orientation of fishhooks A and A' with respect to one another is contemplated as being within the scope of the present invention. FIG. 6a also illustrates that fishhooks A are coplanar, defining an included angle of 180 degrees.

The method of assembling any of the embodiments of the present invention contemplates joining at a single juncture a plurality of fishhooks A with resilient legs 13a at ends opposite their respective barbed ends 13 to comprise a fishhook assembly A having a spring B formed by the juncture together with adjacent portions 13b of the legs urging the barbed ends radially outwardly apart from each other. An elongated bore is formed into a fishing lure body, into which the fishhook assembly is then inserted to hold the fishhooks in compressed relation. A suitable retainer is then provided for holding the fishhook assembly within the elongated bore.

It is thus seen that a fishing lure may be provided wherein a fishhook assembly having a spring is held in contracted relation solely by the wall of an elongated bore in a fishing lure body, promoting the ease with which the assembly slides with respect to the body to enable the barbed ends to spread radially outwardly upon a fish strike. Accordingly, the fish-catching capabilities of the user are greatly improved, and the minimal amount of parts comprising the embodiments of the invention promotes simple construction thereof.

While a preferred embodiment of the invention has been described using specific terms, such description is for illustrative purposes only, and it is to be understood that changes and variations may be made without departing from the spirit or scope of the following claims.

What is claimed is:

1. A spring loaded fishing lure comprising:

a unitary fishhook assembly comprised of two fishhooks having resilient legs converging in a single loop forming a juncture at ends opposite respective barbed ends;

a fishing lure body having an elongated longitudinal bore therein;

said fishhook assembly disposed within said elongated bore such that a wall of said elongated bore holds said assembly in resilient compressed opposed relation;

said fishhook assembly being of sufficient length that said barbed ends protrude outwardly from said body and point radially away from one another, defining an included angle of approximately 180 degrees, to resemble a natural fish tail when in said compressed opposed relation within said bore;

said single loop forming an end of said fishhook assembly remote from said fishhooks;

legs each having one end adjacent a respective end of said loop and carrying said fishhooks on the other end;

parallel intermediate adjacent portions integrally and resiliently joining adjacent ends of said legs and said loopi an outward bend at each integral end of said parallel intermediate adjacent portions and said legs urging said legs radially outwardly when said legs are released from said wall of said bore by a fish caught on said fishhooks;

said loop, said bends, and said parallel intermediate adjacent portions forming a simple spring urging said barbed ends radially outwardly opposed from each other;

said legs and said parallel intermediate adjacent portions being in aligned, spaced, and substantially parallel relation throughout the entire length of said legs and said parallel intermediate adjacent portions when in said compressed opposed relation guiding said unitary fishhook assembly for movement within said elongated bore;

said fishhook assembly being frictionally retained within said elongated bore by the imposition by said spring of said legs against said wall;

a pin within and abutting said loop and limiting rearward movement of said fishhook assembly thereby retaining said fishhook assembly within said elongated bore; and said pin being carried adjacent a tail end of said fishing lure body extending therethrough substantially transversely to a longitudinal axis of said fishing lure body across said longitudinal bore;

said legs and said parallel intermediate adjacent portions meeting in said bends so that a passageway is formed therebetween which is fully open accommodating said pin therebetween allowing said fishhook assembly rearward and forward movement within said elongated bore throughout the full length of said legs and said parallel intermediate adjacent portions;

whereby a fish strike causes said loop to slide toward said pin permitting said legs to diverge outwardly and said barbed ends to be spread apart radially outwardly within the mouth of a fish to provide enhanced fish-catching characteristics.

* * * * *